(12) United States Patent
Harris

(10) Patent No.: US 8,194,765 B2
(45) Date of Patent: Jun. 5, 2012

(54) METHOD AND APPARATUS FOR CONFIGURING CHANNEL QUALITY FEEDBACK IN AN ORTHOGONAL FREQUENCY DIVISION MULTIPLEXING COMMUNICATION SYSTEM

(75) Inventor: John M. Harris, Glenview, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 783 days.

(21) Appl. No.: 12/337,845

(22) Filed: Dec. 18, 2008

(65) Prior Publication Data

US 2009/0274224 A1 Nov. 5, 2009

Related U.S. Application Data

(60) Provisional application No. 61/050,331, filed on May 5, 2008.

(51) Int. Cl.
*H04K 1/10* (2006.01)
(52) U.S. Cl. ........................................ 375/260
(58) Field of Classification Search ............ 375/260, 375/368
See application file for complete search history.

(56) References Cited

U.S. PATENT DOCUMENTS

| 6,775,279 B2 | 8/2004 | Murai et al. |
| 2007/0026810 A1 * | 2/2007 | Love et al. ............... 455/67.11 |

* cited by examiner

*Primary Examiner* — Kevin Kim

(57) ABSTRACT

In an Orthogonal Frequency Division Multiplexing communication system wherein a frequency bandwidth is divided into multiple sub-bands, a method and a scheduler is provided for configuring channel quality feedback for a point-to-multipoint communication session involving multiple users equipment (UEs). The scheduler receives multiple channel quality measurements from the multiple UEs and, based on the multiple channel quality measurements, determines whether to implement a frequency selective channel quality feedback scheme or a non-frequency selective channel quality feedback scheme for the point-to-multipoint communication session. The scheduler then implements the determined channel quality feedback scheme. In another embodiment of the invention, the scheduler may determine whether to implement a frequency selective or non-frequency selective channel quality feedback scheme based on a number of UEs serviced by the scheduler.

19 Claims, 3 Drawing Sheets

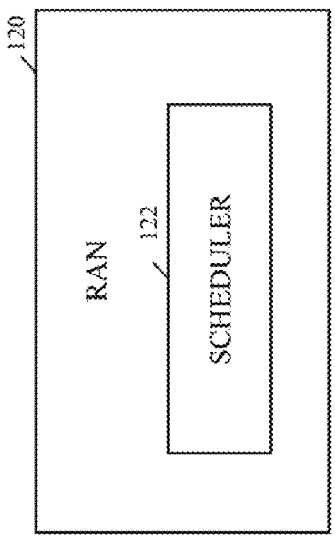
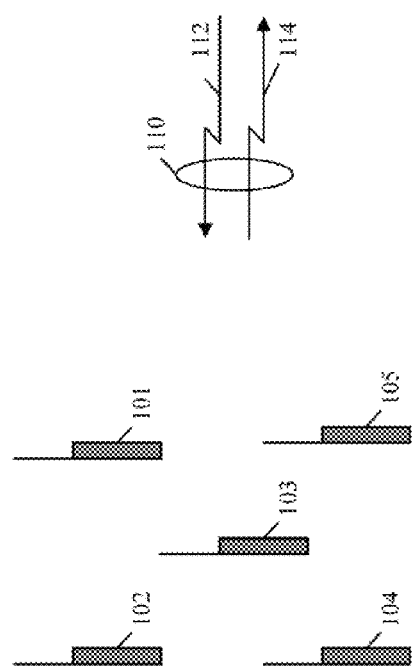
FIG. 1
FIG. 2
FIG. 3

METHOD AND APPARATUS FOR CONFIGURING CHANNEL QUALITY FEEDBACK IN AN ORTHOGONAL FREQUENCY DIVISION MULTIPLEXING COMMUNICATION SYSTEM

CROSS-REFERENCE TO RELATED APPLICATION

This application claims priority from provisional application Ser. No. 61/050,331, entitled "METHOD AND APPARATUS FOR CONFIGURING CHANNEL QUALITY FEEDBACK IN AN ORTHOGONAL FREQUENCY DIVISION MULTIPLEXING COMMUNICATION SYSTEM," filed May 5, 2008, which is commonly owned and incorporated herein by reference in its entirety.

FIELD OF THE INVENTION

The present invention relates generally to Orthogonal Frequency Division Multiplexing (OFDM) communication systems, and, in particular, to channel quality feedback in an OFDM communication system.

BACKGROUND OF THE INVENTION

Orthogonal Frequency Division Multiple Access (OFDMA) modulation schemes have been proposed for downlink transmissions over an air interface in next generation communication systems such as 3GPP (Third Generation Partnership Project) E-UTRA (Evolved UMTS Terrestrial Radio Access), 3GPP2 Phase 2, and Worldwide Interoperability for Microwave Access (WiMAX) communication systems. In an OFDMA communication system, a frequency channel, or bandwidth, is split into multiple contiguous sub-bands, or Resource Blocks (RBs). Each sub-band comprises multiple, for example, 12 or 14, contiguous frequency sub-carriers that are orthogonal to each other. A grouping of multiple sub-bands, or RBs, comprises a sub-band group, or a Resource Block Group (RBG). A radio access network (RAN) then assigns the sub-bands to users' equipment (UEs) on a sub-frame basis, wherein a sub-frame may have, for example, a duration of one millisecond (ms).

In order to maximize bandwidth usage, OFDMA communication systems may engage in Frequency Diverse Scheduling (FDS) or narrowband scheduling. Narrowband scheduling is referred to as band-AMC within the 802.16 standard. Within narrowband scheduling, there are two ways of performing CQI reporting. In one method, called non-frequency selective CQI reporting, a user equipment (UE) is simply told which sub-band report on, and the UE reports on the CQI of that sub-band and is scheduled on that sub-band. In another approach, called frequency selective CQI reporting, a UE is instructed to measure a list of sub-bands and to report on the sub-bands with the best signal strength. Currently, frequency selective CQI reporting is not used in broadcast or multicast communication sessions (point-to-multipoint). However, wideband CQI reporting, wherein a UE reports an average CQI for an entire bandwidth, may not assure that a sub-band or sub-bands selected for the broadcast or multicast session will provide acceptable service to all participating UEs.

Therefore, a need exists for an improved method and apparatus for configuring CQI feedback in a broadcast or multicast OFDM communication session.

BRIEF DESCRIPTION OF THE DRAWINGS

FIG. 1 is a block diagram of a wireless communication system in accordance with an embodiment of the present invention.

FIG. 2 is a block diagram of a user equipment in accordance with an embodiment of the present invention.

FIG. 3 is a block diagram of a scheduler in accordance with an embodiment of the present invention.

Figure 4:
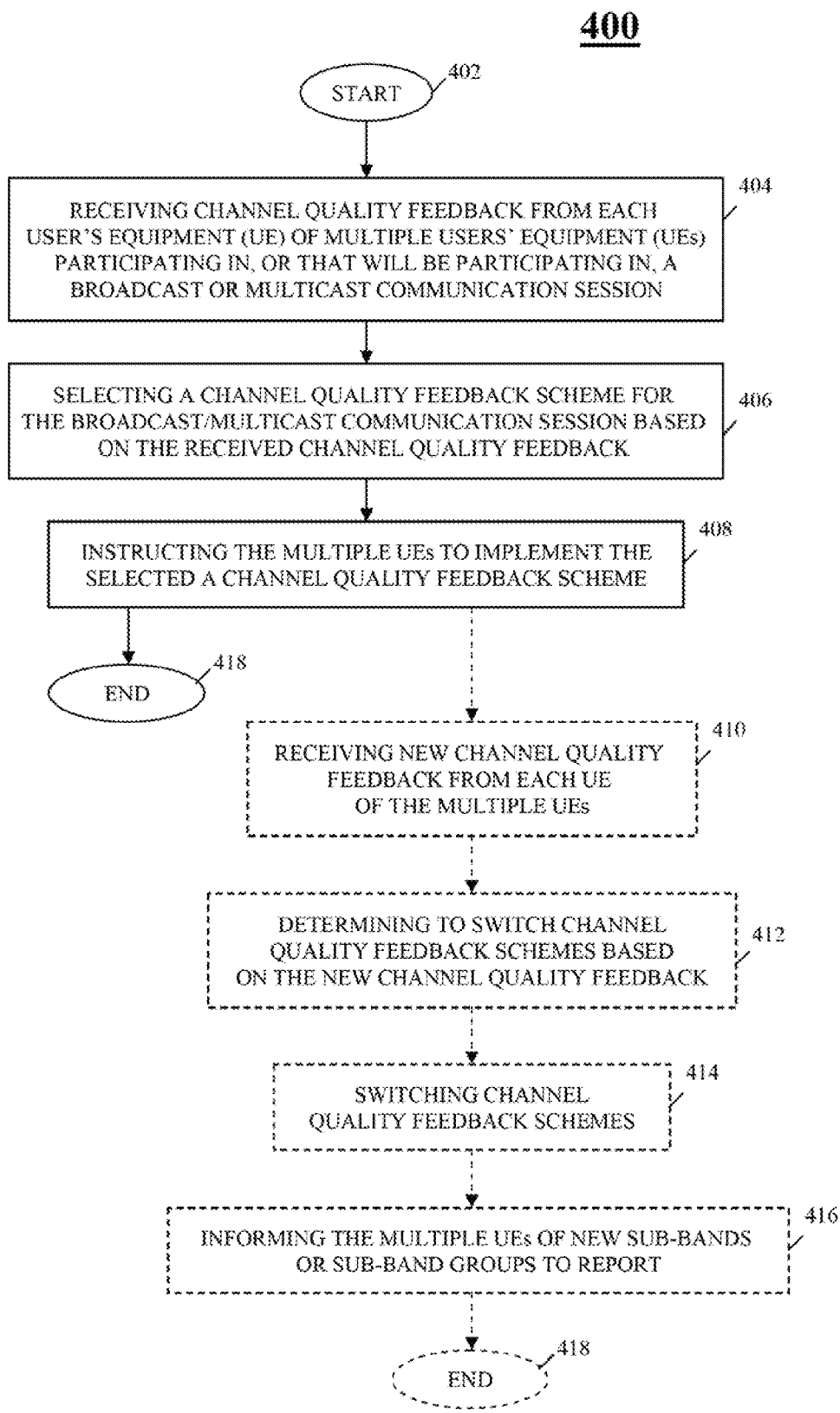
FIG. 4 is a logic flow diagram illustrating a method by which the communication system of FIG. 1 configures channel quality feedback and schedules sub-bands for a downlink broadcast or multicast of a communication session to multiple participants in accordance with various embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that provides for an improved method and apparatus for configuring CQI feedback in a broadcast or multicast Orthogonal Frequency Division Multiplexing (OFDM) communication session, a method and a scheduler are provided that configure channel quality feedback for a point-to-multipoint communication session involving multiple users equipment (UEs). The scheduler receives multiple channel quality measurements from the multiple UEs and, based on the multiple channel quality measurements, determines whether to implement a frequency selective channel quality feedback scheme or a non-frequency selective channel quality feedback scheme for the point-to-multipoint communication session. The scheduler then implements the determined channel quality feedback scheme. In another embodiment of the invention, the scheduler may determine whether to implement a frequency selective or non-frequency selective channel quality feedback scheme based on a number of UEs serviced by the scheduler.

Generally, an embodiment of the present invention encompasses a method for configuring channel quality feedback in an OFDM communication system, wherein a frequency bandwidth is divided into a plurality of sub-bands. The method includes receiving multiple channel quality measurements from multiple users equipment (UEs), based on the multiple channel quality measurements, determining whether to implement a frequency selective channel quality feedback scheme or a non-frequency selective channel quality feedback scheme for a point-to-multipoint communication session involving the multiple UEs, and implementing the determined channel quality feedback scheme.

Yet another embodiment of the present invention encompasses a method for configuring channel quality feedback in an OFDM communication system. The method includes calculating a number of UEs participating in a point-to multi-point communication session, based on the calculated number of participating UEs, determining whether to implement a frequency selective channel quality feedback scheme or a non-frequency selective channel quality feedback scheme for the point-to multipoint communication session, and implementing the determined channel quality feedback scheme.

Still another embodiment of the present invention encompasses a scheduler that is capable of operating in an OFDM communication system and that includes a processor that is configured to receive multiple channel quality reports from multiple UEs, determine, based on the multiple channel quality reports, whether to implement a frequency selective channel quality feedback scheme or a non-frequency selective channel quality feedback scheme for a point-to-multipoint communication session involving the multiple UEs, and implement the determined channel quality feedback scheme.

Yet another embodiment of the present invention encompasses a scheduler that is capable of operating in an OFDM communication system and that includes a processor that is configured to calculate a number of UEs participating in a point-to-multipoint communication session, based on the calculated number of participating UEs, determine whether to implement a frequency selective channel quality feedback scheme or a non-frequency selective channel quality feedback scheme for the point-to-multipoint communication session, and implement the determined channel quality feedback scheme.

The present invention may be more fully described with reference to FIGS. 1-5. FIG. 1 is a block diagram of a wireless communication system 100 in accordance with an embodiment of the present invention. Communication system 100 includes multiple users equipment (UEs) 101-105 (five shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a Radio Access Network (RAN) 120 that provides communication services to each user's equipment (UE) residing in a coverage area of the RAN, that is, UEs 101-105, via an air interface 110. RAN 120 includes a transceiver (not shown), such as a Node B or a Base Transceiver Station (BTS), in wireless communication with each of the multiple UEs 101-105 and further includes an access network controller (not shown), such as a Radio Network Controller (RNC) or a Base Station Controller (BSC), coupled to the transceiver. RAN 120 further includes a packet scheduler 122 that performs the scheduling functions described herein as being performed by the RAN. In various embodiments of the invention, scheduler 122 may be implemented in the transceiver or the controller of RAN 120, or scheduler 122 may be a separate module coupled to each of the transceiver and the controller. Air interface 110 comprises a downlink 112 and an uplink 114. Each of downlink 112 and uplink 114 comprises multiple physical communication channels, including at least one signaling channel and at least one traffic channel.

FIG. 2 is a block diagram of a user's equipment (UE) 200, such as UEs 101-105, in accordance with an embodiment of the present invention. UE 200 includes a processor 202, such as one or more microprocessors, microcontrollers, digital signal processors (DSPs), combinations thereof or such other devices known to those having ordinary skill in the art. The particular operations/functions of processor 202, and respectively thus of UE 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor.

FIG. 3 is a block diagram of scheduler 122 in accordance with an embodiment of the present invention. Scheduler 122 includes a processor 302, such as one or more microprocessors, microcontrollers, digital signal processors (DSPs), combinations thereof or such other devices known to those having ordinary skill in the art. The particular operations/functions of processor 302, and respectively thus of scheduler 122, are determined by an execution of software instructions and routines that are stored in an at least one memory device 304 associated with the processor, such as random access memory (RAM), dynamic random access memory (DRAM), and/or read only memory (ROM) or equivalents thereof, that store data and programs that may be executed by the corresponding processor. Unless otherwise specified herein, the functions of RAN 120 described herein preferably are performed by scheduler 122, and in particular by processor 302 of the scheduler based on instructions maintained in the at least one memory device 304 of the scheduler.

The embodiments of the present invention preferably are implemented within UEs 101-105 and scheduler 122, and more particularly with or in software programs and instructions stored in the respective at least one memory device 204, 304 and executed by respective processors 202, 302 of the UEs and the scheduler. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101-105 and scheduler 122. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interface 110. Preferably, communication system 100 is an Orthogonal Frequency Division Multiple Access (OFDMA) communication system, wherein a frequency bandwidth employed by the communication system is split into multiple frequency sub-bands, or Resource Blocks (RBs), during a given time period. Each sub-band comprises multiple orthogonal frequency sub-carriers over a given number of OFDM symbols, that are the physical layer channels over which traffic and signaling channels are transmitted in a TDM or TDM/FDM fashion. The channel bandwidth also may be sub-divided into one or more sub-band groups, or Resource Block Groups (RBGs), wherein each sub-band group comprises one or more sub-bands that may or may not be contiguous, and the sub-band groups may or may not be of equal size. A communication session may be assigned one or more sub-bands or sub-band groups for an exchange of bearer information, thereby permitting multiple users to transmit simultaneously on the different sub-bands such that each user's transmission is orthogonal to the other users' transmissions.

In addition, communication system 100 preferably comprises a Worldwide Interoperability for Microwave Access (WiMAX) communication system that operates in accordance with the IEEE (Institute of Electrical and Electronics Engineers) 802.16 standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication systems.

For purposes of illustrating the principles of the present invention, it is assumed herein that all of UEs 101-105 are participants in a same broadcast or multicast, that is, point-to-multipoint, communication session. In order to schedule the frequency bandwidth employed by communication system 100 for the broadcast/multicast communication session, each participating UE serviced by RAN 120, that is, UEs 101-105, reports information concerning sub-band quality to the RAN. In order to assure that a sub-band or sub-bands selected for downlink data transmissions of the broadcast/multicast session will provide acceptable service to a worst participating UE, while minimizing system congestion resulting from the reporting, communication system 100 determines whether to implement a non-frequency selective channel quality feedback scheme or an frequency selective channel quality feedback scheme for the session, and in the latter instance determines whether to report on all sub-bands of a frequency bandwidth, a subset of the sub-bands, or select sub-bands within a subset of sub-bands. As conditions change, communication system 100 further may switch between a frequency selective channel quality feedback scheme and a non-frequency selective channel quality feedback scheme during the session.

Referring now to FIG. 4, a logic flow diagram 400 is provided that depicts a method by which RAN 120 configures channel quality feedback and schedules sub-bands for a downlink broadcast or multicast, that is, point-to-multipoint, communication to multiple participants in the broadcast/multicast communication session and that are serviced by the RAN in accordance with various embodiments of the present invention. Logic flow diagram 400 begins (402) when RAN 120 receives (404) channel quality feedback, preferably Channel Quality Information (CQI) messages as is known in the art, from each UE participating, or that will be participating, in the broadcast/multicast communication session and serviced by the RAN, that is, UEs 101-105. Preferably, the channel quality feedback comprises Channel Quality Information (CQI), as is known in the art, associated with each sub-band of one or more sub-bands of the frequency bandwidth employed by communication system 100. However, in various embodiments of the present invention, the channel quality feedback may comprise any channel quality measurement, for example, a received signal power, a signal-to-noise ratio, a carrier-to-interference ratio, a carrier power-to-noise power ratio, a bit error rate, or a frame error rate, that may occur to one of ordinary skill in the art.

In order to report channel quality, each UE 101-105 may measure a channel quality of all of the sub-bands/sub-band groups included in the frequency bandwidth of communication system 100 or may measure a channel quality of a predetermined one or more sub-bands. For example, RAN 120 may instruct UEs 101-105 which sub-bands or sub-band groups to monitor during a measuring period or the UEs may be pre-programmed with information concerning which sub-bands or sub-band groups to monitor during the measuring period. Each UE 101-105 then may report back an average channel quality for all measured sub-bands or sub-band groups, a channel quality measurement for each measured sub-band or sub-band group, or a channel quality measurement for a subset of the measured sub-bands or sub-band groups, for example, for a best one or more sub-bands or sub-band groups of the measured sub-bands or sub-band groups.

In reporting the sub-band measurements, each UE 101-105 may selectively report one or more sub-bands or sub-band groups, from among the measured sub-bands or sub-band groups, whose channel quality information is to be reported back to RAN 120. For example, the UE may compare the measured channel qualities to produce a comparison and, based on the comparison, select a sub-band or sub-band group associated with a best measured channel quality. By way of another example, the UE may compare the measured channel qualities to a threshold maintained in the at least one memory device of the UE and report back measured channel qualities for all sub-bands or sub-band groups whose measured channel qualities exceed the threshold.

Based on the channel quality feedback received from UEs 101-105, RAN 120, and preferably scheduler 122, selects (406) a channel quality feedback scheme and instructs (408) UEs 101-105 to implement the selected channel quality feedback scheme. Logic flow 400 then ends (418). More particularly, based on the reported channel qualities, RAN 120, and in particular scheduler 122, determines whether to implement a frequency selective channel quality feedback scheme or a non-frequency selective channel quality feedback scheme. A frequency selective channel quality feedback scheme comprises a feedback scheme wherein a UE provides channel quality feedback for each of one or more (but fewer than all) sub-bands or sub-band groups in a frequency bandwidth, which sub-band or sub-band groups are selected based on their reported channel quality, such as a narrowband channel quality feedback scheme or a channel quality feedback of only selected sub-bands or sub-band groups. A non-frequency selective channel quality feedback scheme comprises a feedback scheme where the reported sub-bands or sub-band groups are not selected for reporting based on their previously reported channel qualities, for example, where a UE provides channel quality feedback for all sub-bands or sub-band groups or a randomly selected one or more sub-bands or sub-band groups or provides no channel quality feedback, such as a wideband channel quality feedback scheme.

In one embodiment of the present invention, RAN 120 may determine whether to implement a frequency selective or a non-frequency selective channel quality feedback scheme based on a quality differential between the channel quality information reported by each of UEs 101-105. In one such embodiment, RAN 120 may compare the CQI information reported by each UE 101-105 to the CQI information reported by each of the other UEs 101-105 to produce multiple comparisons, determine one or more quality differentials based on the comparisons, and determine whether to implement a frequency selective scheduling scheme based on the one or more quality differentials.

For example, when each UE 101-105 reports an average CQI across multiple sub-bands to RAN 120, the RAN, and in particular scheduler 122, may compare the average CQIs to each other, determine a quality differential between a worst average CQI and a next worst average CQI, and determine whether to implement a frequency selective scheduling scheme based on the quality differential. More particularly, RAN 120 may compare the quality differential to a first quality differential threshold maintained in the at least one memory device 304 of scheduler 122. When the quality differential exceeds the quality differential threshold, RAN 120 may determine to implement a frequency selective channel quality feedback scheme, and when the quality differential is less than the quality differential threshold then RAN 120 may determine to implement a non-frequency selective channel quality feedback scheme.

By way of another example, when each UE 101-105 reports an individual channel quality metric, such as a CQI, for each of one or more sub-bands or sub-band groups of the frequency bandwidth to RAN 120, the RAN may determine a 'worst' CQI from among the CQIs reported by UEs 101-105, for example, where a worst CQI among all reported CQIs is reported by UE 101, and a 'next worst' CQI from among the CQIs reported by the other UEs of UEs 101-105, for example, reported by UE 102. RAN 120 then may compare the 'worst' CQI to the 'next worst' CQI to determine a quality differential and compare the quality differential to a second quality differential threshold, which may or may not be the same as the first quality differential threshold, maintained in the at least one memory device 304 of scheduler 122 to produce a comparison. When the quality differential exceeds the quality differential threshold, RAN 120 may determine to implement a frequency selective channel quality feedback scheme, and when the quality differential is less than the quality differential threshold, the RAN may determine to implement a non-frequency selective channel quality feedback scheduling scheme.

By way of yet another example, RAN 120 may compares CQI information reported by each UE 101-105 to CQI information reported by each of the other UEs 101-105 to produce multiple comparisons. For example, RAN 120 may compare each CQI reported by a UE to all CQIs reported by all other UEs. When any one or more of the comparisons yields a quality differential that exceeds a third quality differential threshold that is maintained in the at least one memory device 304 of scheduler 122, and which third quality differential threshold may or may not be the same as one or more of the first or second quality differential thresholds, RAN 120 may determine to implement a frequency selective channel quality feedback scheme. If none of the multiple comparisons yields a quality differential that exceeds the third quality differential threshold, then RAN 120 may determine to implement a non-frequency selective channel quality feedback scheme.

When RAN 120 determines to implement a frequency selective channel quality feedback scheme, then at step 408 the RAN directs the participating UEs 101-105 to measure a selected subset of the sub-bands or sub-band groups in the frequency bandwidth and report only sub-bands or sub-band groups selected by the UEs from among the sub-bands or sub-band groups included in the subset. More particularly, RAN 120, and in particular scheduler 122, assembles a subset of the sub-bands or sub-band groups of the frequency bandwidth, which subset comprises one or more sub-bands or sub-band groups but fewer than all sub-bands in the frequency bandwidth and conveys the subset to UEs 101-105. Each UE 101-105 then selects one or more sub-bands or sub-band groups from the subset of sub-bands or sub-band groups and provides channel quality feedback to the RAN for the selected sub-band(s) or sub-band group(s).

For example, based on the reported CQIs, RAN 120 may assemble a subset of the sub-bands or sub-band groups of the frequency bandwidth. The subset, comprising multiple but fewer than all sub-bands or sub-band groups in the frequency bandwidth, may comprise all sub-bands or sub-band groups that had an acceptable CQI reported by all reporting UEs 101-105 (for example, better than a predetermined CQI threshold), may comprise a best sub-band or sub-band group reported by each UE 101-105, or may comprise sub-bands or sub-band groups determined by a combination of the two.

RAN 120 then conveys the subset, that is, a list of the sub-bands or sub-band groups included in the subset, to each reporting UE 101-105. Each UE 101-105 then reports back channel quality metrics, preferably CQI, for one or more sub-bands or sub-band groups selected by the UE from among the sub-bands or sub-band groups in the subset.

For example, RAN 120 may instruct each UE 101-105 to report CQI information only for a sub-band or sub-band sub-band group of the subset that has a best measured channel quality, such as a signal strength. By way of another example, RAN 120 may further instruct each UE 101-105 to report CQI information only for a sub-band or sub-band sub-band group in the subset with a worst measured channel quality. In this manner, the RAN then is able determine and schedule, for the broadcast/multicast, a sub-band or sub-band group that is assured to be acceptable to all UEs 101-105. Thus the RAN maximizes the opportunity for a UE 101-105 experiencing the worst channel conditions to receive the broadcast/multicast.

By way of yet another example, suppose UEs 101 and 102 have the worst reported channel qualities from among the multiple reporting UEs 101-105. Further, suppose that the 'best' sub-band or sub-band group reported by each of UEs 101 and 102 is the same. In such an instance, RAN 120 may instruct the UEs to report a channel quality for the 'best' sub-band or sub-band group from among those reported by these 'worst' UEs 101, 102. By way of yet another example, again suppose UEs 101 and 102 have the worst reported channel qualities from among the multiple reporting UEs 101-105, but further suppose that the 'best' sub-band or sub-band group reported by UE 101 is different than the 'best' sub-band or sub-band group reported by UE 102. In such an instance, RAN 120 may instruct the UEs to report a channel quality for both 'best of the worst' sub-bands or sub-band groups for the broadcast/multicast. In one such embodiment, RAN 120 then may broadcast the entire session over each such sub-band or sub-band group. However, this may consume excessive system capacity. Therefore, in another such embodiment, RAN 120 may alternate the broadcast over each such sub-band or sub-band group, for example, sending every other video frame over a first 'best of the worst' sub-band or sub-band group, reported by UE 101, and sending the other video frames over a second 'best of the worst' sub-band or sub-band group, reported by UE 102. In such an instance, each of UEs 101 and 102, whose 'best' sub-band or sub-band group is either the first such sub-band or sub-band group or the second sub-band or sub-band group, may receive low quality, but still acceptable, video, while the other UEs 103-105 of the reporting UEs 101-105 each may receive acceptable video over each of the first sub-band or sub-band group and the second sub-band or sub-band group, and thus receive a higher quality video.

When RAN 120 determines to implement a non-frequency selective channel quality feedback scheme, the RAN instructs UEs 101-105 to provide non-frequency selective channel quality feedback, for example, wideband channel quality feedback wherein an average CQI is reported across all sub-bands in the frequency bandwidth, channel quality feedback for a specific sub-band selected by the RAN, or no channel quality feedback. For example, RAN 120 may instruct UEs 101-105 to determine an average channel quality across all sub-bands of the frequency bandwidth and report that average, or may randomly select a sub-band or sub-band group for the broadcast or multicast and instruct the UEs to report a channel quality for the randomly select a sub-band or sub-band group.

In yet another embodiment of the present invention, after determining whether to implement a frequency selective scheduling scheme or a frequency diverse scheduling scheme and scheduling the broadcast or multicast of the communication session for the selected one or more sub-bands or sub-band groups, RAN 120, and in particular scheduler 122, may determine (412) whether to switch channel quality feedback schemes, that is, may re-determine whether to implement a frequency selective channel quality feedback scheme or a frequency diverse channel quality feedback scheme. The re-determination may be based on channel quality reports received (410) by RAN 120 from UEs 101-105 subsequent to the preceding determination of which channel quality feedback scheme to implement and may be made as described above.

In response to determining to implement a scheduling scheme that is different from a currently implemented scheme, scheduler 122 may switch (414) channel quality feedback schemes for the communication session and inform (416) the reporting UEs of the new sub-bands or sub-band groups to report. Thus movement by a UE 101-105 that results in the UE's reported channel qualities to shift relative to the channel qualities reported by the other UEs 101-105 may result in a switch of a downlink channel quality feedback scheme. Logic flow 400 then ends (418).

For example, suppose that a channel quality initially reported by a worst UE, for example, UE 101, from among UEs 101-105 was worse than a channel quality reported by all other UEs 102-105 by more than a quality differential threshold. As a result, RAN 120 initially determined to implement frequency selective channel quality feedback scheme. Suppose that UE 101 then moves closer to RAN 120 or to the other UEs 102-105. For example, UEs 101-105 may be emergency responders that are converging on an accident site. As a result of the convergence of the UEs, a channel quality reported by UE 101 now differs from the channel qualities reported by each of UEs 102-105 by less than the quality differential. In such an instance, RAN 120 may determine to switch to a non-frequency selective channel quality feedback scheme and may instruct the reporting UEs to so switch.

By way of another example, suppose UEs 101-105 are emergency responders that initially are converged and are then are dispersed to cover a given area. Further suppose that, when converged, a channel quality reported by each of UEs 101-105 differs from the channel qualities reported by all other UEs 101-105 by less than a quality differential threshold. As a result, RAN 120 may initially determine to implement a non-frequency selective channel quality feedback scheduling. When the UEs disperse, so do their measured channel qualities and, as a result, a channel quality reported by a UE, for example, UE 101, may deteriorate to a point that it is worse than the channel qualities reported by all other UEs 102-105 by more than the quality differential threshold. In such an instance, RAN 120 may determine to switch to a frequency selective channel quality feedback scheme and may instruct the reporting UEs to so switch.

Figure 5:
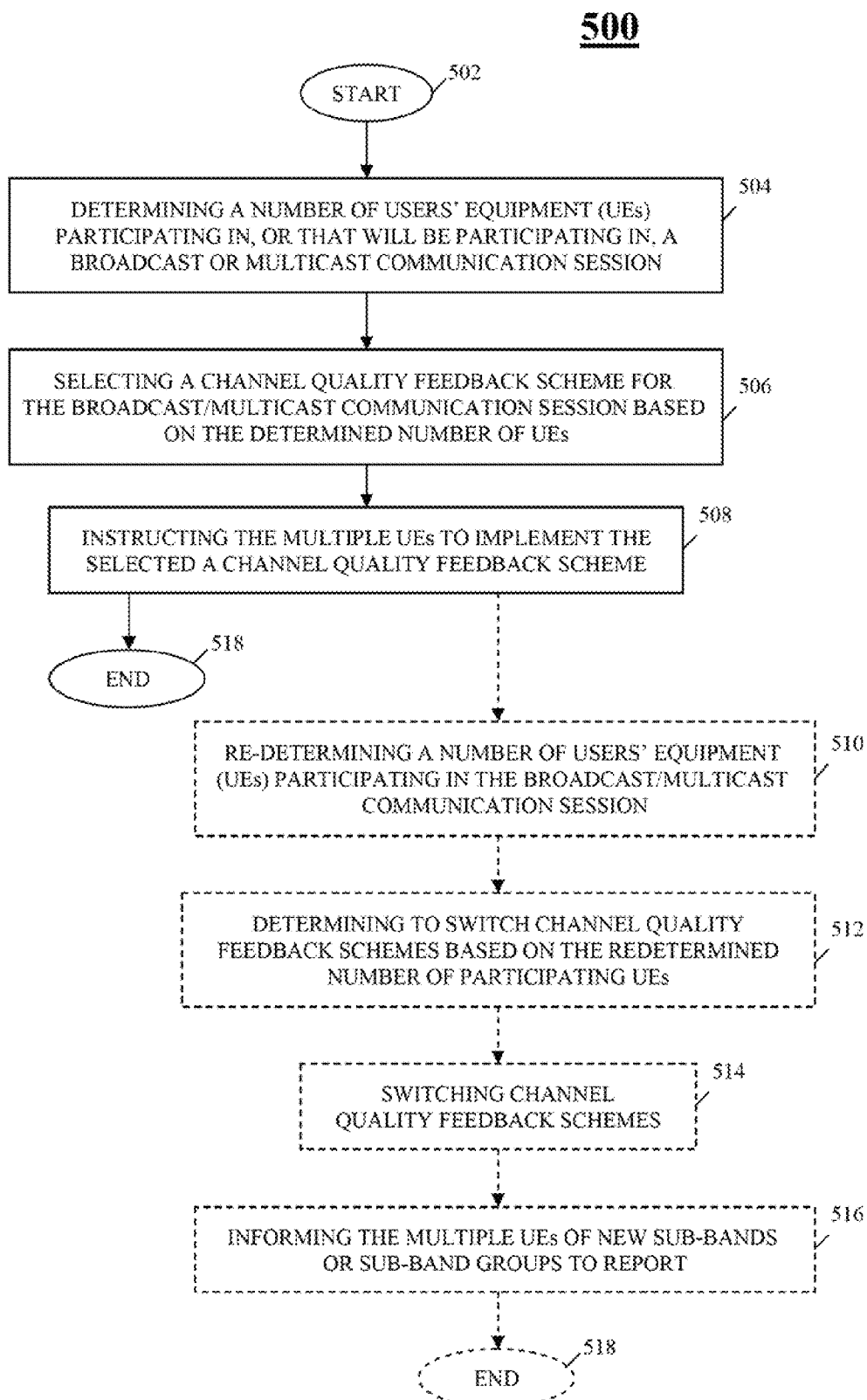
FIG. 5 is a logic flow diagram illustrating a method by which the communication system of FIG. 1 configures channel quality feedback and schedules sub-bands for a downlink broadcast or multicast of a communication session to multiple participants in accordance with various embodiments of the present invention.

In another embodiment of the present invention, instead of, or in addition to, determining whether to implement a frequency selective scheduling scheme or a frequency diverse scheduling scheme based on reported channel qualities, RAN 120, and in particular scheduler 122, may determine whether to implement a frequency selective channel quality feedback scheme or a non-frequency selective channel quality feedback scheme based on a number of UEs participating in the broadcast/multicast communication session and serviced by the RAN. Referring now to FIG. 5, a logic flow diagram is provided that depicts a method by which RAN 120 configures channel quality feedback and schedules sub-bands for a downlink broadcast/multicast of a communication session to multiple participants in the session that are serviced by the RAN based on a calculated number of participating UEs.

Logic flow diagram 500 begins (502) when RAN 120 calculates (504) a number of UEs participating in the communication session and serviced by the RAN. For example, as is known in the art, when RAN 120 is engaged in a broadcast/multicast communication session, such as a Multimedia Broadcast Multicast Service (MBMS) or a Broadcast-Multicast Service (BCMCS), the RAN broadcasts a notification of the service. In response to the broadcast of the notification, the participating UEs serviced by RAN 120, such as UEs 101-105, notify the RAN of their participation. RAN 120 then may calculate a number of participating UEs based on the responses. By way of another example, when the communication session is a group call, a RAN, such as RAN 120, typically receives UE identifiers associated with each MS serviced by the RAN and participating in the call. Based on the UE identifiers, the RAN can calculate a number of participating UEs serviced by the RAN.

Based on the calculated number of participating UEs, RAN 120 selects (506) a channel quality feedback scheme and instructs (508) UEs 101-105 to implement the selected channel quality feedback scheme. Logic flow 500 then ends (516). More particularly, based on the calculated number of participating UEs, RAN 120, and in particular scheduler 122, selects either a frequency selective channel quality feedback scheme or a non-frequency selective channel quality feedback scheme. For example, RAN 120 may compare the calculated number of participating UEs to a quantity threshold to produce a comparison. When the calculated number is less than the threshold, RAN 120 may determine to implement a frequency selective channel quality feedback scheme. When the calculated number exceeds the threshold, RAN 120 may determine to implement a non-frequency selective channel quality feedback scheme.

When RAN 120 determines to implement a frequency selective channel quality feedback scheme, the RAN assembles a sub-band or sub-band group subset comprising one or more sub-bands or sub-band groups (but fewer than all sub-bands in the frequency bandwidth) based on previously reported channel qualities. For example, as described in detail above, RAN may include in the subset all sub-bands or sub-band groups that had an acceptable CQI reported by all reporting UEs 101-105 or may include in the subset a best sub-band or sub-band group reported by each UE. RAN 120 then conveys the subset to the UEs 101-105 and instructs each UE 101-105 to provide channel quality feedback for one or more sub-bands or sub-band groups of the subset selected by the UE, for example, only for a best measured sub-band or sub-band group in the subset or only for a worst measured sub-band or sub-band group in the subset.

When RAN 120 determines to implement a non-frequency selective channel quality feedback scheme, the RAN instructs UEs 101-105 to provide non-frequency selective channel quality feedback, for example, wideband channel quality feedback or no channel quality feedback. For example, RAN 120 may instruct UEs 101-105 to determine an average channel quality across all sub-bands of the frequency bandwidth and report that average, or may randomly select a specific sub-band or sub-band group for the broadcast or multicast and instruct the UEs to report a channel quality for the randomly selected sub-band or sub-band group.

In yet another embodiment of the present invention, after determining whether to implement a frequency selective channel quality feedback scheme or a non-frequency selective channel quality feedback scheme and scheduling the broadcast or multicast of the communication session for the selected one or more sub-bands or sub-band groups, RAN 120, and in particular scheduler 122, may determine (510) whether to switch channel quality feedback schemes, that is, may re-determine whether to implement a frequency selective channel quality feedback scheme or a frequency diverse channel quality feedback scheme. The re-determination may be based on a new calculation (512), by RAN 120, of a number of UEs participating in the communication session and served by the RAN, for example, based on a consideration of a number of UE handoffs, hand-ins, registrations, or de-registrations.

In response to determining to implement a scheduling scheme that is different from a currently implemented scheme, scheduler 122 may switch (512) channel quality feedback schemes for the communication session, including selecting new sub-bands or sub-band groups for reporting by the UEs and informing the reporting UEs of the new sub-bands or sub-band groups, and may inform (514) the UEs of the new channel quality feedback scheme and sub-bands or sub-band groups. Thus movement by a UE 101-105 that results in a change in a number of participating UEs, may result in a switch of the channel quality feedback scheme. Logic flow 500 then ends (516).

For example, suppose additional emergency responders arrive at an accident scene from outside of the coverage area. In such an instance, RAN 120 may re-calculate a number of UEs participating in the communication session and may determine to switch from a frequency selective channel quality feedback scheme to a non-frequency selective channel quality feedback scheme based on the recalculated larger number. On the other hand, as the accident scene gets resolved and emergency responders depart the accident scene, RAN 120 may determine to switch from a non-frequency selective channel quality feedback scheme to a frequency selective channel quality feedback scheme based on a re-calculated smaller number of participants.

By providing a scheduler that determines a channel quality feedback scheme for a broadcast or multicast communication session based on a number of participants in the communication session and/or based on channel quality information reported by the multiple participants, the scheduler is able to optimize channel quality feedback for the session. Based on the number of participants and/or the reported channel quality information, the scheduler determines whether to implement a frequency selective channel quality feedback scheme or a non-frequency selective channel quality feedback scheme. In response to determining to implement the former, the scheduler then can direct the participating UEs to measure a selected subset of the sub-bands or sub-band groups in the frequency bandwidth and report only sub-bands or sub-band groups selected by the UEs from among the sub-bands or sub-band groups included in the subset. A result is that the scheduler is better able to assure that whatever sub-band or sub-band groups is scheduled for a downlink broadcast or multicast of the communication session has an acceptable quality for all participants. In addition, the scheduler may switch between a frequency selective channel quality feedback scheme and a non-frequency selective channel quality feedback scheme during the communication session, thereby implementing whatever feedback scheme is optimal at any particular time during the session.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for configuring channel quality feedback in an Orthogonal Frequency Division Multiplexing communication system, wherein a frequency bandwidth is divided into a plurality of sub-bands, the method comprising:
   receiving a plurality of channel quality measurements from a plurality of user equipment;
   based on the plurality of channel quality measurements, determining whether to implement a frequency selective channel quality feedback scheme or a non-frequency selective channel quality feedback scheme for a point-to-multipoint communication session involving the plurality of user equipment;
   implementing the determined channel quality feedback scheme; and
   when the determined scheduling scheme comprises a frequency selective channel quality feedback scheme, instructing the plurality of user equipment to implement a narrowband channel quality feedback scheme wherein a user equipment is given a list of sub-bands and is instructed to report back a subset of the list comprising one or more sub-bands that the user equipment finds to have a best signal strength among the sub-bands on this list; and
   when the determined scheduling scheme comprises a non-frequency selective channel quality feedback scheme, instructing the plurality of user equipment to one of: implement a wideband channel quality feedback scheme, to report on a specific sub-band, or not to report channel quality.

2. The method of claim 1, wherein determining whether to implement a frequency selective channel quality feedback scheme or a non-frequency selective channel quality feedback scheme comprises:
   determining one or more quality differentials based on the plurality of channel quality measurements received from the plurality of user equipment; and
   determining whether to implement a frequency selective channel quality feedback scheme or a non-frequency selective channel quality feedback scheme based on the one or more quality differentials.

3. The method of claim 2, wherein determining one or more quality differentials based on the plurality of channel quality measurements received from the plurality of user equipment comprises determining a difference between a channel quality reported by a user equipment of the plurality of user equipment and a channel quality reported by another user equipment of the plurality of user equipment.

4. The method of claim 3, wherein determining a difference between a channel quality reported by a user equipment of the plurality of user equipment and a channel quality reported by another user equipment of the plurality of user equipment comprises determining a difference between a worst channel quality reported by the plurality of user equipment and a next worst channel quality reported by a different user equipment of the plurality of user equipment and wherein determining whether to implement a frequency selective channel quality feedback scheme or a non-frequency selective channel quality feedback scheme comprises determining to implement a frequency selective channel quality feedback scheme when the difference exceeds a threshold.

5. The method of claim 2, wherein determining whether to implement a frequency selective channel quality feedback scheme or a non-frequency selective channel quality feedback scheme based on the one or more quality differentials comprises:
  comparing a quality differential of the one or more quality differentials to a quality differential threshold to produce a comparison; and
  determining whether to implement a frequency selective scheduling scheme or a frequency diverse scheduling scheme based on the comparison.

6. The method of claim 5, wherein determining whether to implement a frequency selective scheduling scheme or a frequency diverse scheduling scheme based on the comparison comprises:
  when the quality differential exceeds the threshold, implementing a frequency selective scheduling scheme; and
  when the quality differential is less than the threshold, implementing a frequency diverse scheduling scheme.

7. The method of claim 1, further comprising:
  re-determining, during a communication session that includes the one of a broadcast and a multicast to the plurality of user equipment, whether to implement a frequency selective channel quality feedback scheme and a non-frequency selective channel quality feedback scheme; and
  in response to the re-determination, switching channel quality feedback schemes.

8. A method for configuring channel quality feedback in an Orthogonal Frequency Division Multiplexing communication system, the method comprising:
  calculating a number of user equipment participating in a point-to-multipoint communication session;
  based on the calculated number of participating users equipment, determining whether to implement a frequency selective channel quality feedback scheme or a non-frequency selective channel quality feedback scheme for the point-to-multipoint communication session; and
  implementing the determined channel quality feedback scheme.

9. The method of claim 8, wherein determining whether to implement a frequency selective channel quality feedback scheme or a non-frequency selective channel quality feedback scheme comprises:
  comparing the calculated number of participating user equipment to a quantity threshold to produce a comparison; and
  determining whether to implement a frequency selective channel quality feedback scheme or a non-frequency selective channel quality feedback scheme based on the comparison.

10. The method of claim 9, wherein determining whether to implement a frequency selective channel quality feedback scheme or a non-frequency selective channel quality feedback scheme based on the comparison comprises:
  when the calculated number is less than the threshold, determining to implement a frequency selective channel quality feedback scheme; and
  when the calculated number exceeds the threshold, determining to implement a non-frequency selective channel quality feedback scheme.

11. The method of claim 8, further comprising:
  re-calculating, during a communication session that includes the one of a broadcast and a multicast to the plurality of user equipment, a number of participants in the communication session; and
  in response to the re-calculation, switching channel quality feedback schemes.

12. A scheduler that is capable of operating in an Orthogonal Frequency Division Multiplexing communication system and that comprises a processor that is configured to receive a plurality of channel quality reports from a plurality of user equipment, determine, based on the plurality of channel quality reports, whether to implement a frequency selective channel quality feedback scheme or a non-frequency selective channel quality feedback scheme for a point-to-multipoint communication session involving the plurality of user equipment, and implement the determined channel quality feedback scheme;
  wherein the processor is configured to instruct the plurality of user equipment to implement a channel quality feedback scheme by, when the determined channel quality feedback scheme comprises a frequency selective channel quality feedback scheme, instructing the plurality of user equipment to implement a narrowband channel quality feedback scheme wherein a user equipment is given a list of sub-bands and is instructed to report back a subset of the list comprising one or more sub-bands that the user equipment finds to have a best signal strength among the sub-bands on this list, and when the determined channel quality feedback scheme comprises a non-frequency selective channel quality feedback scheme, instructing the plurality of user equipment to one of: implement a wideband channel quality feedback scheme, report on a specific sub-band, or not to report channel quality.

13. The scheduler of claim 12, wherein the processor is configured to determine whether to implement a frequency selective channel quality feedback scheme or a non-frequency selective channel quality feedback scheme by determining one or more quality differentials based on the plurality of channel quality measurements received from the plurality of user equipment and determining whether to implement a frequency selective channel quality feedback scheme or a non-frequency selective channel quality feedback scheme based on the one or more quality differentials.

14. The scheduler of claim 13, wherein the processor is configured to determine one or more quality differentials based on the plurality of channel quality measurements received from the plurality of user equipment by determining a difference between a channel quality reported by a user equipment of the plurality of user equipment and a channel quality reported by another user equipment of the plurality of user equipment.

15. The scheduler of claim 14, wherein the processor is configured to determine a difference between a channel quality reported by a user equipment of the plurality of user equipment and a channel quality reported by another user equipment of the plurality of user equipment by determining a difference between a worst channel quality reported by the plurality of user equipment and a next worst channel quality reported by a different user equipment of the plurality of user equipment and wherein the processor is configured to determine whether to implement a frequency selective channel quality feedback scheme or a non-frequency selective channel quality feedback scheme by determining to implement a frequency selective channel quality feedback scheme when the difference exceeds a threshold.

16. The scheduler of claim 13, wherein the processor is configured to determine whether to implement a frequency selective channel quality feedback scheme or a non-frequency selective channel quality feedback scheme based on the one or more quality differentials by comparing a quality differential of the one or more quality differentials to a quality differential threshold to produce a comparison and determining whether to implement a frequency selective channel quality feedback scheme or a non-frequency selective channel quality feedback scheme based on the comparison.

17. The scheduler of claim 16, wherein the processor is configured to determine whether to implement a frequency selective channel quality feedback scheme or a non-frequency selective channel quality feedback scheme based on the comparison by, when the quality differential exceeds the threshold, implementing a frequency selective channel quality feedback scheme, and when the quality differential is less than the threshold, implementing a non-frequency selective channel quality feedback scheme.

18. The scheduler of claim 12, wherein the processor further is configured to re-determine, during a communication session that includes the one of a broadcast and a multicast to the plurality of user equipment, whether to implement a frequency selective channel quality feedback scheme and a non-frequency selective channel quality feedback scheme and, in response to the re-determination, switching scheduling schemes.

19. A scheduler that is capable of operating in an Orthogonal Frequency Division Multiplexing communication system and that comprises a processor that is configured to calculate a number of user equipment participating in a point-to-multipoint communication session, based on the calculated number of participating users equipment, determine whether to implement a frequency selective channel quality feedback scheme or a non-frequency selective channel quality feedback scheme for the point-to-multipoint communication session, and implement the channel quality feedback scheduling scheme.

* * * * *

UNITED STATES PATENT AND TRADEMARK OFFICE
CERTIFICATE OF CORRECTION

PATENT NO. : 8,194,765 B2  Page 1 of 1
APPLICATION NO. : 12/337845
DATED : June 5, 2012
INVENTOR(S) : Harris It is certified that error appears in the above-identified patent and that said Letters Patent is hereby corrected as shown below:

Title Page, Figure, Line 2, after "SELECTED" delete "A".

In Fig. 4, Sheet 2 of 3, for Tag "408", in Line 2, after "SELECTED" delete "A".

In Fig. 5, Sheet 3 of 3, for Tag "508", in Line 2, after "SELECTED" delete "A".

Signed and Sealed this
Twenty-ninth Day of January, 2013

David J. Kappos
*Director of the United States Patent and Trademark Office*